Sept. 1, 1970  F. W. PEPE  3,526,381
PIPE HANGER
Filed April 29, 1968
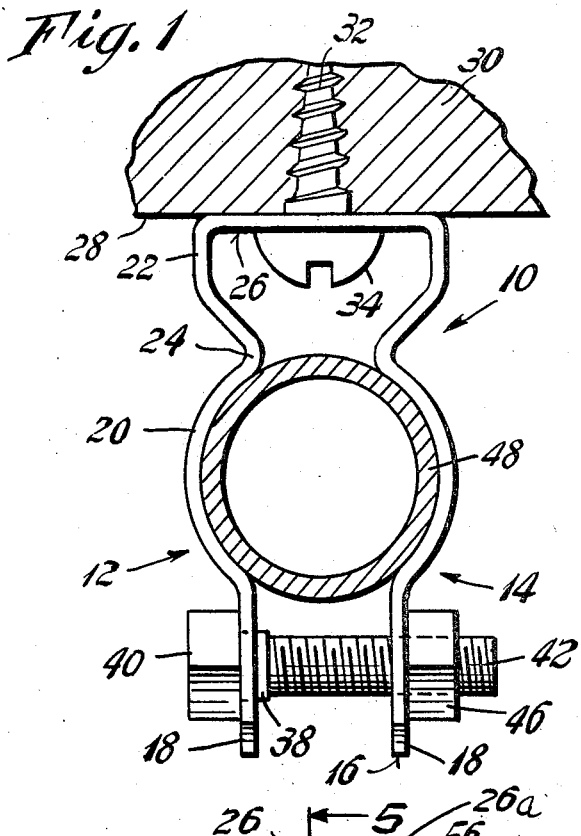
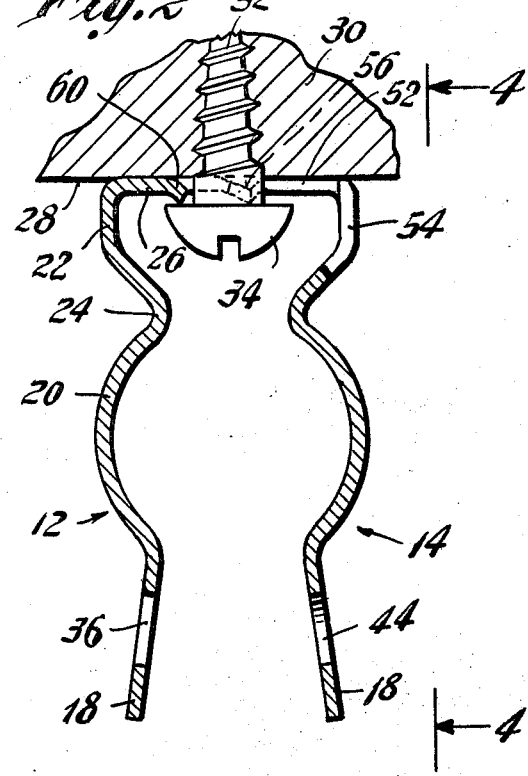
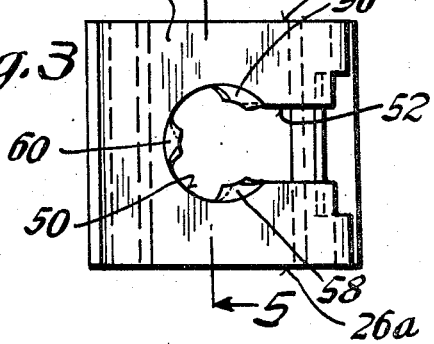
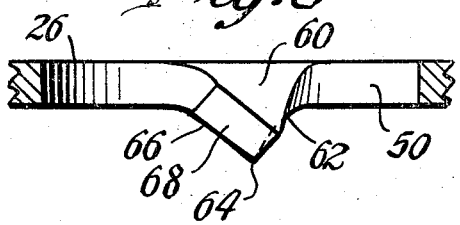
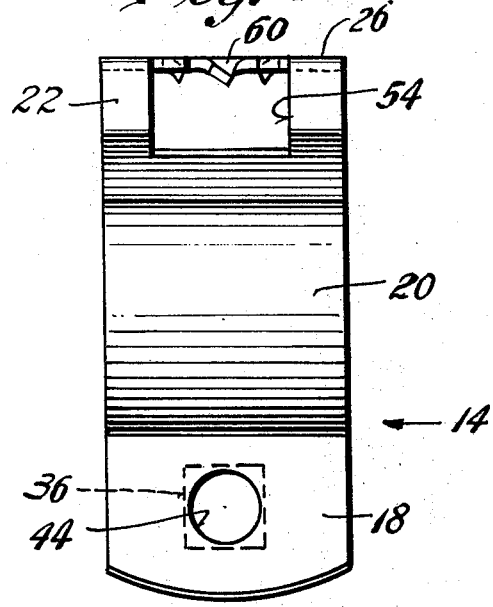
INVENTOR.
Frank W. Pepe
BY Martin D. Wittstein
ATTORNEY United States Patent Office 3,526,381
Patented Sept. 1, 1970

3,526,381
PIPE HANGER
Frank W. Pepe, 637 Prospect Drive,
Lordship, Conn.
Filed Apr. 29, 1968, Ser. No. 724,970
Int. Cl. F16l 3/00
U.S. Cl. 248—71                                   10 Claims

ABSTRACT OF THE DISCLOSURE

A pipe hanger of the suspended clamp type which cannot inadvertently dislodge itself from a connecting screw when initially installed and after the screw has been once tightened on the clamp, and which responds to the tightening of the screw to thereafter prevent inadvertent loosening thereof. The clamp has a bent tab construction which overlies the head of the securing screw to positively engage therewith when the hanger is initially installed and which partially closes a lateral access opening in the securing portion of the hanger during tightening of the screw, and also acts as a built in lock washer to resist turning of the screw in the non-tightening direction.

BACKGROUND OF THE INVENTION

This invention relates generally to pipe or conduit supporting devices and more particularly to a suspended pipe clamp or hanger having improved means for securing the hanger to a supporting surface.

Pipe hangers of the general type to which the present invention relates are well known in the art as represented by the two patents to A. I. Appleton, Nos. 3,185,418 and 3,310,264. These hangers are relatively simple in construction and very economical to manufacture in large quantities, and once installed, hold a pipe very securely in a rigid position. They are, therefore, highly commercially successful and satisfactory for their intended function.

There are, however, some distinct disadvantages to these hangers which have not been satisfactorily solved prior to this invention. One of these is that the hangers are somewhat awkward to install in a precise location relative to a predetermined position of the pipe to be supported. Most such pipe hangers have an aperture centrally located in a flat web portion adapted to bear on a supporting surface, the aperture receiving therethrough a securing screw or bolt. In order to insert the securing element, access must be had thereto from beneath the head of the securing element, thereby necessitating installation of the hanger before the pipe is put into place; alternatively, the pipe must be pushed aside to permit installation of the hanger. In the former procedure it is difficult to accurately determine the proper location of the hanger in order to engage and support the pipe without placing any lateral stress thereon, and the latter procedure makes it difficult to position the hanger and insert the securing element into the supporting surface, and may even damage a thin wall pipe.

To obviate these difficulties, the web portion of the hanger is provided with a slot extending from the central aperture to one of the side legs of the hanger, the slot being just wide enough to permit passage of the shank of a particular sized securing element. The side leg is provided with an enlarged opening in the upper portion of the leg which communicates with the slot and which is large enough to pass the head of the securing element. Thus it becomes a simple procedure to initially insert the securing element into the supporting structure, either before the pipe has been put in place, or after the pipe has been put into place and then with only a very small amount of displacement of the pipe and without the awkwardness and interference of the loosely dangling hanger. The securing element is not completely tightened, but rather sufficient space is left between the supporting surface and the head of the securing element to receive the web portion of the hanger. The hanger is then inserted laterally on the securing element and the latter is tightened, after which the pipe is inserted in the hanger. Alternatively the hanger may be placed on the pipe first and then inserted on the securing element, after which the securing element is tightened from the side, for example, by an L-shaped ratchet screw driver.

This procedure, however, creates the difficulty that the hanger is not constrained against movement in all directions during subsequent tightening of the securing element and it is free to shift laterally. One solution to this problem is shown in the Appleton patents mentioned above, which disclose a hanger having downwardly projecting tabs adapted to engage the peripheral wall or edge of the head of the securing element which prevent the hanger from shifting laterally and slipping off the securing element during installation of the hanger and final tightening of the securing element. However, this solution has not been altogether satisfactory since the securing element must be left with sufficient space between the supporting surface and the head to permit downwardly projecting tabs to pass over the head of the securing element, thereby leaving the hanger relatively loose on the securing element and still subject to dislodgement therefrom, as well as rendering subsequent tightening more difficult due to the care which must be exercised to avoid dislodging the hanger from the securing element.

Another disadvantage of prior art pipe hangers is that they are subject to becoming loose on the supporting structure over a period of time due to gradual loosening of the securing element. With a hanger of the type disclosed in the Appleton patents this results in the possibility of the hanger being inadvertently dislodged from the securing element. With the more conventional hanger having merely an aperture in the web portion of the hanger, a common lock washer obviates this difficulty. However, a lock washer cannot easily be utilized with a hanger constructed as shown in the Appleton patents since this would require additional space between the head of the securing element and the supporting surface to allow the lock washer to pass and also it would require that the lock washer be smaller in diameter than the head of the securing element in order to fit inside of the tabs. Generally, lock washers have an outside diameter larger than the head of the securing element for which they are designed.

The improved hanger construction of the present invention obviates or eliminates these and other disadvantages of prior art clamp type pipe hangers by providing a novel tab construction which cooperates with a securing element to perform the threefold functions of positively holding the hanger against inadvertent displacement when the hanger is initially placed on the securing element, placing a restriction or barrier in the entrance slot to prevent the securing element from passing through the slot in response to final tightening of the securing element, and resisting loosening of the securing element in the manner of a lock washer after the securing element has been completely tightened.

The principles of the present invention are embodied in a hanger having a pair of opposed pipe encircling legs each having a free end and being connected together at their opposite ends by a flat web portion disposed generally at 90° to the legs, the hanger being therefore generally U-shaped. The web portion has a central aperture adapted to receive a securing element therethrough, and there is a slot extending from the aperture to an edge of the web portion, preferably the edge which coincides with the upper edge of one of the legs, the slot being wide enough to pass the shank of the securing element therethrough. In the preferred construction, the said one leg has an enlarged opening big enough to pass the head of the securing element. A plurality of formed tabs are disposed adjacent to and within the central aperture, one such tab being located on each side of the slot at the intersection thereon with the aperture, at least one additional tab being located within the aperture.

In a preferred embodiment, the tabs are initially formed with a twist of about 45° in a direction so as to present an edge which opposes turning of the securing element in a loosening direction. The tabs are also bent downwardly relative to the normal position of the hanger and are of such a length that when so bent, the securing element passes between the opposed tabs at the intersection of the slot and the aperture but when lying flat in the plane of the web portion of the hanger they close the slot sufficiently so that the securing element cannot pass therethrough. The dimensions of the aperture and the tabs are such that the tabs overlie the head of the securing element so that the tabs are bent substantially flat when the securing element is tightened.

Thus by initially inserting the securing element into the supporting structure by substantially a predetermined amount, the pipe hanger can be placed on the securing element with a positive and firm holding engagement between the securing element and the bent tabs, after which, when the securing element is tightened, the tabs both close the entrance opening from the slot into the aperture to prevent the securing element from passing therethrough in the event that the securing element becomes loose, and also forcibly bear on the flat upper surface of the head of the securing element in the manner of a conventional lock washer to resist gradual loosening of the securing element during long periods of use.

Having briefly described the general nature of the present invention, it is a principal object thereof to provide an improved pipe hanger of novel construction having features and advantages not heretofore obtained.

Another object of the present invention is to provide a pipe hanger which is installed on a securing element after the latter has been substantially inserted into a supporting structure in such manner that the hanger is initially positively held against inadvertent dislodgement from the securing element.

It is another object of the present invention to provide a pipe hanger which cannot be inadvertently dislodged from a securing element once the latter has been manually tightened should the securing element thereafter become loose on the supporting structure.

It is a still further object of the present invention to provide a pipe hanger in which an integrally formed portion of the hanger cooperates with the securing element to act in the nature of a lock washer to prevent the securing element from working loose over an extended period of use.

It is yet another object of the present invention to provide a pipe hanger which is simple, efficient and economical to manufacture in large quantities.

These and other objects and advantages of the present invention will be more readily apparent from an understanding of the following detailed description of a preferred embodiment of the present invention when considered in conjunction with the accompanying drawings in which:

FIG. 1 is a side view of the pipe hanger of the present invention shown fully installed on a supporting structure and having a pipe section supported therein;

FIG. 2 is a side sectional view of the hanger of FIG. 1 prior to full tightening of the securing element and with the pipe section removed;

FIG. 3 is a plan view of the hanger shown without the securing element;

FIG. 4 is an end view of the hanger as seen on the line 4—4 of FIG. 2, shown with the pipe section and securing element removed; and FIG. 5 is a fragmentary sectional view drawn to an enlarged scale taken on the line 5—5 of FIG. 3.

DETAILED DESCRIPTION OF THE INVENTION

Referring now to the drawings, the pipe hanger of the present invention is seen to comprise an inverted generally U-shaped member 10 formed from an elongate relatively thin strip of metal and bent to the desired configuration. The member 10 has a pair of opposed spaced apart legs 12 and 14 each of which has a free end 16, a flat tab portion 18, a curved pipe encircling portion 20 and another flat portion 22 connected to the curved portion 20 by an inwardly necked down portion 24. The legs 12 and 14 are connected together at their upper ends by a flat web portion 26 which is adapted to bear against the undersurface 28 of a supporting structure 30 which may be a ceiling, beam or other member into which a securing element such as the screw 32 may be inserted. The screw 32 has a head 34 adapted to bear on the underside of the web 26 to securely fasten the hanger 10 to the supporting structure 30.

The tab 18 of the leg 12 is provided with a square aperture 36 adapted to receive a reduced square portion 38 of the square head 40 of a lag bolt 42, the shank of which extends through a circular aperture 44 formed in the tab 18 of the leg 14. A nut 46 is threadedly received on the bolt 42 for drawing the curved portion 20 of the legs 12 and 14 tightly around a pipe section 48 to support the latter in the manner shown in FIG. 1.

As best seen in FIGS. 3 and 4, the web portion 26 is provided with a central aperture 50 and a slot 52 which extends from the aperture 50 to the intersection of the web 26 with the upper flat portion 22 of the leg 14. The latter is provided with an enlarged opening 54 which communicates with the slot 52 and which extends downwardly into the flat portion 22 of the leg 14. Alternatively the slot 52 could extend from the aperture 50 to one of the free side edges 26a of the web portion 26, in which case the opening 54 in the leg 14 could be omitted.

The relative dimensions of the aperture 50, slot 52 and opening 54 are predetermined in relation to a standard sized screw with which the hanger 10 is intended to be used. Thus the enlarged opening 54 is sized to permit the head 34 of the screw to pass freely therethrough. The slot 52 is at least wide enough to permit the widest portion of the shank 32 of the screw to pass freely therethrough, but not wide enough to permit the head 34 of the screw to pass therethrough. The diameter of the aperture 50 is slightly larger than the slot 52 and the diameter of the widest part of the shank of the screw but less than the diameter of the head 34 of the screw, the diameter of the aperture being related to the diameter of the screw in a manner more clearly understood below.

In order to achieve the three significant advantages resulting from this invention, i.e., providing a positive and secure engagement between the hanger and the securing element upon initial installation, preventing inadvertent dislodgement of the hanger from the securing element during and after tightening of the latter, and resisting subsequent gradual loosening of the securing element during long periods of use, a plurality of tabs are provided in the area of the aperture 50 which, in conjunction with the screw 32, perform these functions as hereinafter specifically described.

A pair of tabs 56 and 58 are formed integrally with the web portion 26 and are located substantially at the intersection of the aperture 50 with the slot 52. At least one additional tab 60 is located within the aperture 50 preferably midway between the tabs 56 and 58 around the periphery of the aperture 50. Referring to FIG. 5, it will be seen that each of the tabs 56, 58 and 60 (only the tab 60 being shown for the sake of clarity) are integrally formed with the web 26 and are initially deformed out of the plane of the web portion 26 in two different directions. Thus the tab 60 (and the tabs 56 and 58) is twisted to substantially a 45° angle about a horizontal axis substantially midway between the upper and lower surfaces of the web portion 26 in a clockwise direction when viewed as in FIG. 5. This deformation results in a side edge 62 and a corner 64 being depressed below the lower surface of the web 26, and a lengthwise edge 66 being disposed at an angle to the lower surface of the web 26. The tab 60 is then bent downwardly at an angle of about 45° to the plane of the web portion 26 thereby further depressing the corner 64 and edges 62 and 66 below the lower surface of the web 26.

It will now be recognized that the downward bending of the tabs 56, 58 and 60 serve to enlarge the circular opening defined by the inner surfaces 68 of the tabs prior to their being bent downwardly. Thus, the dimensions of the tabs 56 and 58, which effectively define the opening from the slot 52 into the aperture 50, are such that the spacing between the tabs 56 and 58 is substantially the same as the width of the slot 52 or perhaps slightly less than the width of the slot, but not substantially greater than that required to allow the widest part of the shank of the screw 32 to pass therethrough. Also, as indicated above, the aperture 50 is dimensioned so that the tabs 56, 58 and 60 will overlie the flat portion of the head 34 of the screw, with at least a portion of the web 26 around the aperture 50 also overlying the head 34 of the screw 32.

The procedure for installing the hanger of the present invention is substantially as follows. The precise location of the hanger is determined, either before or after the pipe is assembled in place with the other pipe sections and the screw 32 is inserted into the supporting structure 30 until the flat surface of the head 34 of the screw is spaced a predetermined distance from the undersurface of the supporting structure, substantially as shown in FIG. 2. This predetermined distance should be substantially equal to, or very slightly less than, the distance from the upper surface of the web 26 to the corner 64 of the tabs 56, 58 and 60, which distance can be very accurately determined after a little experience with installing the clamps.

The clamp is then inserted on the screw by shifting the hanger laterally so that the head 34 of the screw passes through the enlarged opening 54 in the leg 14 of the hanger, and the shank 32 of the screw passes through the slot 52. Lateral movement of the hanger continues until the tabs 56 and 58 engage with the upper flat surface of the head 34 of the screw and tend to wedge the web portion 26 and the tabs 56 and 58 between the head 34 and the undersurface of the supporting structure, assuming that the screw 32 has been initially inserted by the proper amount. Continued lateral shifting of the hanger, which may now require a certain amount of force, causes the screw shank 32 to pass through the opening defined by the tabs 56 and 58 and enter the aperture, whereupon further lateral shifting of the hanger is arrested by abutment of the screw 32 by the tab 60. The hanger is now installed on the screw 32 and is firmly held in place by the wedging action of the tabs and the web portion 26 between the surface of the supporting structure and the head of the screw as shown in FIG. 2.

If it is desired to fully tighten the screw utilizing a conventional screwdriver before the pipe 48 is installed in the hanger, the screw is turned in the conventional clockwise tightening direction. As the screw further penetrates into the supporting structure, the flat surface of the head 34 of the screw begins to bend the tabs 56 and 58 and 60 back into the plane of the web 26, thereby gradually reducing the diameter of the opening defined by the inner surfaces 68 of the tabs, with the result that the tabs 56 and 58 reduce the size of the opening from the slot 52 into the aperture 50 to less than the diameter of the screw shank 32 as the tabs 56 and 58 approach a flat condition. Thus it will be apparent that the hanger thereafter cannot be removed from the screw by lateral shifting should the screw become loose in the supporting surface 30 or be intentionally loosened therein.

As a further result of tightening the screw, and owing to the initial twist imparted to the tabs 56 and 58 and 60, the gradual flattening of the tabs is resisted by the initial twist and a high degree of stress is created within the tabs which tends to cause the downwardly projecting corners 64 to dig into the flat surface of the head 34 of the screw. Due to the direction of twist of the tabs, the corners 64 will not strongly resist turning of the screw in the normal tightening direction, i.e., clockwise, but they will very strongly resist turning of the screw in the opposite direction, thereby tending to maintain the screw fixed in the final position in which it is placed. Thus the tabs 56, 58 and 60 act in the manner of a lock washer to resist any tendency for the screw to work loose over an extended period of time.

The final step in the installation procedure is to insert the pipe section 48 between the legs 12 and 14 of the clamp and to secure the legs to the pipe section 48 by means of the bolt 42 and nut 46.

It will be apparent from the foregoing that there is provided a pipe hanger which achieves the objects and advantages of the invention and avoids the disadvantages of prior art hanger. It is to be understood that the embodiment above described and shown in the accompanying drawings is merely illustrative of the principles of the invention and is the best mode presently preferred for carrying out the invention, and is susceptible to change in form, size, detail and arrangement of parts, the invention being intended to cover all such modifications, variations and equivalents thereof as may be deemed to be within the scope of the claims appended hereto.

What I claim and desire to secure by Letters Patent is:

1. A pipe hanger of the suspended clamp type adapted to be secured to the undersurface of a supporting structure by a securing element having a threaded shank and an enlarged head, said hanger comprising:
   (A) a generally U-shaped member defining a pair of opposed spaced apart legs having pipe encircling portions and free end portions adapted to be secured together to rigidly hold a pipe section,
   (B) a flat web portion interconnecting said legs at their opposite ends,
   (C) an aperture formed in said web portion adapted to receive the shank of said securing element therethrough,
   (D) an elongate slot formed in said web portion, said slot communicating with said aperture and extending to an edge of said web portion, said slot being at least wide enough to pass the shank of said securing element, and
   (E) means formed integrally with said web portion and located substantially at the intersection of said aperture and said slot for securely engaging the head of said securing element when the hanger is initially placed thereon after the securing element has been inserted into a supporting structure with the head thereof still spaced from the supporting structure by a predetermined distance and for locking the securing element after the securing element has been fully tightened on the web portion of said hanger.

2. A pipe hanger according to claim 1 wherein said last named means is formed to close said slot in response to the tightening of said securing element on the web portion of said hanger by an amount at least sufficient to prevent the shank of said securing element from passing therethrough.

3. A pipe hanger according to claim 1 wherein said last named means is formed to engage the head of said securing element with an edge which permits said securing element to be relatively freely turned in a tightening direction but which strongly resists turning of said securing element in the opposite direction.

4. A pipe hanger of the suspended clamp type adapted to be secured to the undersurface of a supporting structure by a securing element having a threaded shank and an enlarged head, said hanger comprising:
- (A) a generally U-shaped member defining a pair of opposed spaced apart legs having pipe encircling portions and free end portions adapted to be secured together to rigidly hold a pipe section,
- (B) a flat web portion interconnecting said legs at their opposite ends,
- (C) an aperture formed in said web portion adapted to receive the shank of said securing element therethrough,
- (D) an elongate slot formed in said web portion, said slot communicating with said aperture and extending to an edge of said web portion, said slot being at least wide enough to pass the shank of said securing element therethrough, and
- (E) tab means formed integrally with said web portion and located substantially at the intersection of said aperture and said slot, said tab means having a portion projecting downwardly beneath the plane of said web portion for engaging the upper flat surface of the head of said securing element when the hanger is initially placed thereon after the securing element has been inserted into a supporting structure with the head thereof still spaced from the supporting structure by a predetermined distance and after the securing element has been fully tightened on the web portion of said hanger.

5. A pipe hanger according to claim 4 wherein said tab means is formed to have sufficient length in a direction generally radially of said aperture so as to partially close said slot when said tab means is bent into the plane of said web portion in response to tightening of said securing element on the web portion of said hanger, the closing of said slot by said tab means being by an amount at least sufficient to prevent the shank of said securing element from passing therethrough.

6. A pipe hanger according to claim 4 wherein said tab means is formed to be twisted about an axis lying in the plane of said web portion and extending generally radially of said aperture, said tab means being so twisted in a direction such as to present an edge to the upper surface of the head of said securing element which permits the securing element to be relatively freely turned in a tightening direction but which strongly resists turning of said securing element in the opposite direction.

7. A pipe hanger of the suspended clamp type adapted to be secured to the undersurface of a supporting structure by a securing element having a threaded shank and an enlarged head, said hanger comprising:
- (A) a generally U-shaped member defining a pair of opposed spaced apart legs having pipe encircling portions and free end portions adapted to be secured together to rigidly hold a pipe section,
- (B) a flat web portion interconnecting said legs at their opposite ends,
- (C) an aperture formed in said web portion adapted to receive the shank of said securing element therethrough,
- (D) an elongate slot formed in said web portion, said slot communicating with said aperture and extending to the intersection of said web portion with one of said legs, said slot being at least wide enough to pass the shank of said securing element therethrough,
- (E) an enlarged opening formed in said one leg and communicating with said slot, said enlarged opening being at least wide enough to pass the enlarged head of said securing element, and
- (F) tab means formed integrally with said web portion and located substantially at the intersection of said aperture and said slot for engaging the head of said securing element when the hanger is initially placed thereon after the securing element has been inserted into a supporting structure with the head thereof still spaced from the supporting structure by a predetermined distance and for closing said slot at least enough so that the shank of said securing element cannot pass therethrough in response to the tightening of said securing element on the web portion of said hanger.

8. A pipe hanger according to claim 7 wherein said tab means comprises at least a pair of generally radially projecting tabs disposed on opposite sides of said slot, said tabs each being bent downwardly to provide a portion of each tab disposed beneath the plane of said web portion for engagement with the upper flat surface of the head of said securing element, said tabs being of sufficient length radially of said aperture to close said slot by said amount required to prevent passage of the shank of said securing element therethrough when said tabs are pressed back into the plane of said web portion by said securing element.

9. A pipe hanger according to claim 8 wherein said tabs are also bent to approximately a 45° angle about an axis lying in the plane of said web portion and extending generally radially of said aperture, said tabs being so twisted in a direction such as to present a relatively sharp edge to the upper surface of the head of said securing element which permits the securing element to be relatively freely turned in a tightening direction but which tends to dig into the upper surface of the head of said securing element to strongly resist turning of said securing element in the opposite direction.

10. A pipe hanger according to claim 8 wherein said tab means includes a third tab disposed on the periphery of said aperture opposite said slot, said tab also being bent downwardly to provide a portion thereof beneath the plane of said web portion, said third tab providing an abutment means for limiting the movement of said securing element through said slot and for centering said securing element in said aperture.

References Cited

UNITED STATES PATENTS

| | | | |
|---|---|---|---|
| 1,169,310 | 1/1916 | Wakeland | 181—35 X |
| 2,297,957 | 10/1942 | Hanneman | 151—35 |
| 3,185,418 | 5/1965 | Appleton | 248—72 |
| 3,302,914 | 2/1967 | Becker | 248—74 |

CHANCELLOR E. HARRIS, Primary Examiner

U.S. Cl. X.R.

248—74